May 3, 1938.   L. F. SCOTT   2,116,366
FOLDING SEAT
Filed Jan. 24, 1936   2 Sheets-Sheet 2
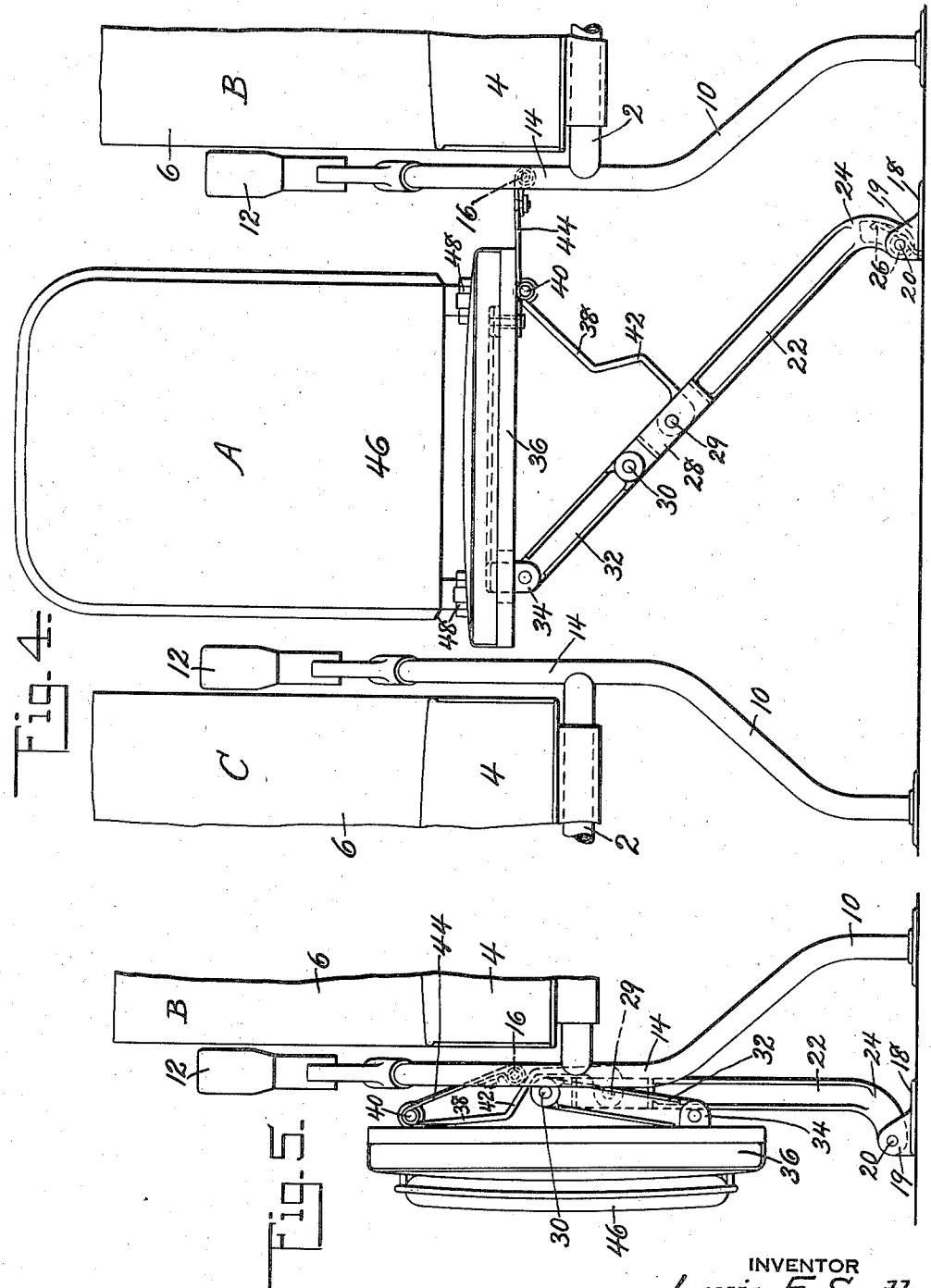
INVENTOR
Louis F. Scott
BY
ATTORNEY Patented May 3, 1938

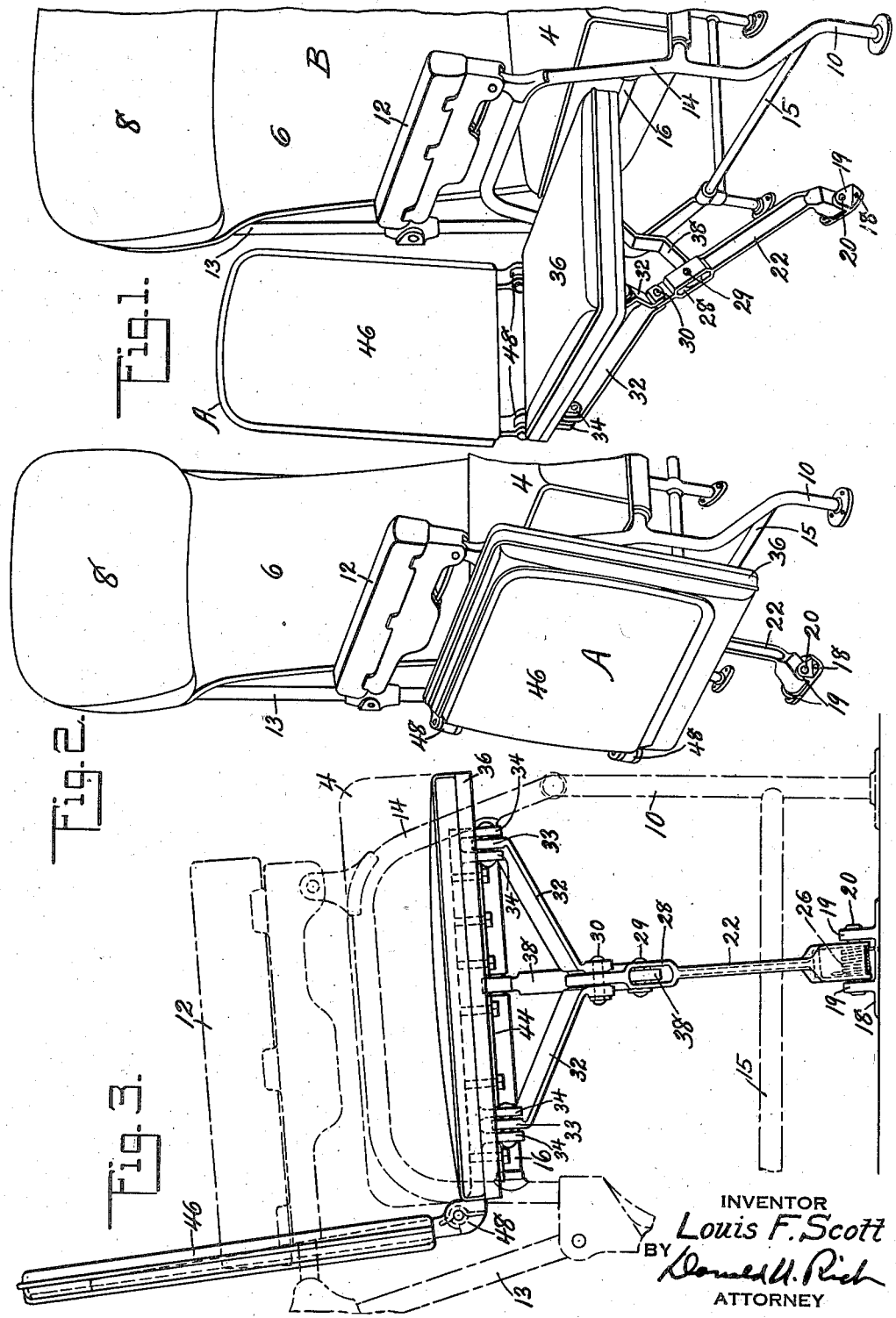

2,116,366

UNITED STATES PATENT OFFICE 2,116,366

FOLDING SEAT

Louis F. Scott, Philadelphia, Pa., assignor to The J. G. Brill Company, Philadelphia, Pa., a corporation of Pennsylvania Application January 24, 1936, Serial No. 60,560

6 Claims. (Cl. 155—33)

This invention relates to folding seats in general and in particular to folding seats for use in the aisles of buses and trolley cars.

Previous folding seats have in most cases when folded presented a rough appearance with the props and connections outermost in a position to tear the clothing of persons passing the seat. The old type of folding seat has also transferred a major portion of the occupant's weight to the adjacent seat frame thus further stressing the seat frame. It is an object, therefore, of this invention to provide a folding seat in which the major portion of the occupant's weight is transferred to the floor independent of the adjacent seat frame.

Another object of the invention is the provision of a folding seat wherein the only stress transferred to the adjacent or main seat frame does not add to the stresses of that frame caused by occupants of the main seat.

A further object of the invention is the provision of a folding seat in which all connections are concealed when the seat is folded.

A still further object of the invention is the provision of a folding seat which may be attached to existing seat frames with a minimum of labor and structural changes.

These and other objects of the invention will be apparent to one skilled in the art from a study of the following description and the accompanying drawings, in which:

Figure 1 is a perspective view of the folding seat and a portion of the main seat frame;

Fig. 2 is a perspective view similar to Fig. 1 but showing the seat in the folded position;

Fig. 3 is an end view of the seat shown in Fig. 1;

Fig. 4 is a front view of the seat shown in Fig. 1 and showing the relation of the seat to the companion seat across the aisle, and Fig. 5 is a front view of the folded seat shown in Fig. 2.

Referring now to the drawings in detail, the folding seat A is attached to the adjacent frame of main seat B and when in the use position as shown in Figs. 1 and 4, substantially fills the aisle space between the seat B and its companion seat C. It is, of course, obvious that this folding seat may be used in other locations than in an aisle, such as on the side walls of a vehicle or building. The main seat B and the companion main seat C are formed by a light tubular frame 2 to which is attached the suspension upholstery unit comprising a cushion 4, back 6 and pillow 8. The end frame 10 has attached thereto the arm rest 12 carrying mechanism permitting the adjustment of the back 13 to various positions of inclination. The main seat end frame is formed of an inverted U-shaped member 14 having its ends resting on the floor and with the arms of the U joined by lower crosstie 15 and by an intermediate crosstie 16 which may be brazed in place in case a folding seat is to be applied.

The folding seat, which is of general application, consists of a floor bracket 18, having spaced lugs 19 which carry a pivot pin 20 upon which is mounted an arm or strut 22, having a curved lower portion 24 adapted to be engaged by torsion spring 26 tending to swing the arm to the upright position. The arm or strut is formed with an eye portion 28 across which extends a fixed pivot pin 29 and with an opening at the end opposite the curved portion which opening is adapted to receive a fixed pivot pin 30. The fixed pivot pin 30 carries diverging compression arms 32, the upper ends 33 of which are disposed between spaced lugs 34 secured to the outer edge of the folding seat base 36, while fixed pivot pin 29 carries a compression brace or arm 38. The brace 38 is connected at its upper end to the central portion of the inner edge of the seat base by hinge pin 40 and has its lower portion offset as at 42 sufficiently to permit the brace to overlap the upper end of the strut when the seat is folded as shown in Fig. 5.

By reference to Figs. 1 and 3 it will be seen that the lower extremity of the arm 38 is reduced to permit pivotal arrangement within the eye 28 of the strut 22, and the shoulders provided by thus reducing the arms are adapted to engage the inner adjacent faces of the eye portion to thus act as a stop for limiting the folding movement of this part in one direction on its pivot.

It is thus seen that the seat base is supported on the strut at three spaced fixed pivot points by three converging compression members thus giving a rigid construction which will cause the strut to take substantially the entire weight imposed upon the seat, but since the strut does not transmit its load to the floor beneath the seat center, it is necessary to prevent rotation of the entire unit about the pin 29 and this is accomplished by pivotally connecting the hinge pin 40 to the main seat frame crosstie 16 by means of plate 44 which may, if desired, be made of sufficient width as to be substantially coextensive with the seat to close the space adjacent the main seat. The hinge pin 40 is located under the seat and spaced inwardly of the adjacent seat edge whereby the seat when in open position will partially rest upon the connecting plate 44. This arrangement provides a stop to limit the rotation of the seat in one direction on the hinge pin 40. Either or both of the described stop elements may be utilized to facilitate the operation of the structure. The folding seat is provided with a seat back 46 connected to the seat base by hinges 48 which are preferably provided with springs which will insure the back being held upon the seat base when not occupied.

The operation of the seat is extremely simple for, assuming the folding seat in the position shown in Fig. 1, the seat back will fall upon the seat cushion as soon as the occupant rises and it is only necessary to lift up the inner edge of the seat base causing the seat to assume the position shown in Fig. 2 in which all operating parts are covered, thus preventing injury to the person or clothing of people passing the folded seat. It should be noted that due to the relation of pivots 29 and 30 and the fact that a portion of the seat base beyond pivot 40 rests upon the plate 44 the seat can be rotated in but the one direction and that when folded the relation of pivots 20, 30 and 40 is such as to insure the seat being retained against the seat or object to which it is attached. It should also be noted that, due to the particular arrangement of the compression struts and the plate 44, the center of the mass of the seat remains substantially in the same horizontal plane at all times thereby permitting folding or righting of the seat with minimum effort which is equivalent to a rotation of the seat about one of its horizontal center lines. To place the folded seat back in operative position it is only necessary to lift upward on the lower edge of the seat causing the unit to rotate about pivot 20 and crosstie 16 and assume the final position. The pivot 20 and crosstie 16 are preferably inclined as shown in order to give a slight inclination to the seat cushion.

The folding seat has been described as connected to another seat but this, of course, is not necessary as it will operate equally well as an auxiliary seat attached either to an automobile, or bus structure or to the wall of a building or trailer. These changes in position as well as others and various changes in form will suggest themselves to persons skilled in the art and those changes and modifications are contemplated as fall within the scope of the appended claims.

What is claimed is:

1. A folding seat for floored structures comprising, a seat base, converging compression arms connected at spaced points adjacent one edge of the seat base, brace means acting in compression and connected to the opposite edge of said seat base, strut means secured at one end to the floor and at the other end to said converging arms, said brace means being fixedly pivoted to said strut intermediate the strut ends, plate means having one edge pivotally connected to an adjacent structure, the other edge of said plate means being pivoted to said seat base inwardly of the seat edge thereby holding the seat base substantially horizontal.

2. A folding seat for floored structures comprising, a seat base, converging compression arms connected at spaced points adjacent one edge of the seat base, brace means acting in compression and connected to the opposite edge of said seat base, strut means secured at one end to the floor and at the other end to said converging arms, said brace means being fixedly pivoted to said strut intermediate the strut ends thereby permitting folding of the seat, plate means pivoted to said seat base and to an adjacent structure thereby causing the seat to be folded substantially about its horizontal center line, the pivot between said plate means and seat base being positioned inwardly from the seat edge whereby folding of the seat is permitted in only one direction.

3. In combination, a folding seat for a floored structure, a fixed member, a link connection between said seat and fixed member, a strut pivoted to the floor to one side of the seat member, a pair of compression members pivoted at their upper ends at spaced points along the outer edge of said seat and at their lower ends to a common fixed pivot at the upper end portion of said strut, a link pivoted at its upper end to the opposite edge portion of said seat and at its lower end to said strut at a point below the strut connection with said pair of compression members, and stop means for one of said pivots to limit the movement of the pivoted parts.

4. In combination, a folding seat for a floored structure, a fixed member, a strut pivoted to the floor to one side of said seat, a pair of compression members pivoted to one side of said seat at spaced points and to a common pivot adjacent the strut end, a single compression member pivoted to the opposite seat edge and to the strut, the common pivot between the pair of compression members and the strut and the pivot of the single compression member and the strut being arranged on opposite sides of a center line extending from front to rear of said seat, means securing said seat to said fixed member, and stop means for limiting the movement of at least one of said compression members on its pivot.

5. In combination, a folding seat for a floored structure, a fixed member adjacent said seat, a strut member pivoted to the floor to one side of said seat, a pair of compression supporting members pivotally connecting the upper extremity of said strut and one edge of said seat, a third compression member pivotally connecting an intermediate portion of said strut and said seat, the third compression supporting member being offset adjacent the strut connection to provide space to receive the upper portion of said strut when the seat is moved to folded position, a connecting member pivoted to the fixed member and the seat, and stop means for holding said seat in substantially horizontal open position.

6. In combination, a folding seat for a floored structure, a fixed member adjacent said seat, a strut member pivoted to the floor to one side of said seat, a seat base, a pair of compression supporting members pivotally connecting the upper extremity of said strut and one edge of said seat base, a third compression member pivotally connecting an intermediate portion of said strut and the opposite edge of said seat base, and a rigid member pivoted to said fixed member and to said seat base, the latter connection being inward of the adjacent seat base edge to provide an overlapping portion to limit movement of said seat on its pivotal supports.

LOUIS F. SCOTT.